United States Patent [19]

Johnson

[11] 4,219,633

[45] Aug. 26, 1980

[54] PROCESS FOR THE PREPARATION OF ETHYLENE-PROPYLENE RANDOM COPOLYMERS

[75] Inventor: Paul E. Johnson, Aurora, Ill.

[73] Assignee: Standard Oil Company (Indiana), Chicago, Ill.

[21] Appl. No.: 28,091

[22] Filed: Apr. 9, 1979

[51] Int. Cl.$^2$ .......................... C08F 2/02; C08F 2/34; C08F 210/16

[52] U.S. Cl. .................................... 526/348; 526/87; 526/159

[58] Field of Search .......................... 526/348, 159, 87

[56] References Cited

U.S. PATENT DOCUMENTS

| | | | |
|---|---|---|---|
| 3,624,061 | 11/1971 | Hostetler | 526/151 |
| 3,702,352 | 11/1972 | Leibson | 260/878 B |
| 3,736,307 | 5/1973 | Perry | 526/348 |
| 3,944,530 | 3/1976 | Sugita et al. | 526/4 |
| 4,048,409 | 9/1977 | Sugita et al. | 526/348 |

*Primary Examiner*—Stanford M. Levin
*Attorney, Agent, or Firm*—David E. Boone; William T. McClain; William H. Magidson

[57] ABSTRACT

Random copolymers of ethylene and propylene are prepared by a process comprising contacting under bulk or vapor phase polymerization conditions components comprising (a) a catalyst capable of producing substantially crystalline polypropylene; and (b) ethylene and propylene in an essentially constant ratio of about 0.1 to 1.0 mole percent ethylene to about 99.9 to 99.0 mole percent propylene. The random copolymers produced by this process have high clarity and distribution numbers greater than 90.

9 Claims, No Drawings

PROCESS FOR THE PREPARATION OF ETHYLENE-PROPYLENE RANDOM COPOLYMERS

This invention relates to the preparation of resinous random copolymers of ethylene and propylene having improved clarity, increased impact strength and low levels of hydrocarbon solubles. The random copolymers of this invention are further characterized in that they have a distribution number greater than 90.

The field of packaging has seen a large increase in the use of thermoplastics in recent years. It is desirable to have a container material that can be used in place of glass where a transparent and clear bottle is preferred. Some of the physical properties of crystalline polypropylene such as high gloss, stiffness, heat deflection temperature and low water permeability as well as its relative low cost have made it attractive as a container material. However, its lack of clarity and low temperature brittleness are drawbacks to its use. Other resins such as acrylics and phenoxy polymers have superior clarity but are more expensive. The possible presence of vinyl chloride monomer in poly(vinyl chloride) is a drawback to its use in containers.

Ethylene-propylene block copolymers have been prepared which have increased low temperature impact strength and improved clarity. Leibson in U.S. Pat. No. 3,702,352 describes block copolymer compositions with random copolymer first segments and essentially homopolymeric second segments having improved impact properties and contact clarity. Khelghatian et al. in U.S. Pat. No. 3,442,978 teach that multiple segment block copolymers formed by polymerizing propylene-rich feed and ethylene-rich feed in several alternating steps have high impact strength and good contact clarity. These processes have the disadvantage of requiring the cycling of monomer feed compositions in the polymerization reactor or multiple reactor with different monomer compositions in each reactor.

Some random copolymers of ethylene and propylene have been described in the art as forming films with good clarity. The term "random copolymer" is used herein to mean that the ethylene units are randomly distributed within the polymer chain. Perry in U.S. Pat. No. 3,736,307 teaches that a copolymer containing propylene and 2 to 5 weight percent ethylene capable of forming a film having good clarity can be produced in the presence of a catalyst formed by mixing diethylaluminum chloride, titanium trichloride and triphenylphosphite. Hostetler in U.S. Pat. No. 3,624,061 describes a process for forming ethylene-propylene random copolymers by contacting a cocrystallized TiCl$_3$.AlCl$_3$ catalyst with a mixture of about 2 to 20 percent by weight ethylene and about 80 to 98 percent by weight propylene with such resins being useful for molding and extrusion applications. While the processes for preparing such random copolymers do not require multiple reactors or cycling of monomer feed compositions, processes such as that of Hostetler in U.S. Pat. No. 3,624,061 produce high levels of hydrocarbon soluble material. Our studies show that if the ethylene concentration in the polymerization reactor exceeds one mole percent, then hydrocarbon soluble material is produced ordinarily in excess of 10 weight percent of the total copolymer formed.

This "hydrocarbon soluble" material also known as "extractables" in the art, is formed during the polymerization and is soluble in varying degrees in hot hydrocarbons such as pentane, hexane or heptane. Such material can cause processing difficulties due to tackiness of the polymer product unless it is extracted to a level of about 10 weight percent or less during the polymerization or in a post-polymerization extraction step. When the polymerization reaction is carried out in an inert hydrocarbon medium, much of this soluble material is removed from the polymer product. An economically disadvantageous separate extraction step is required to remove such material if the polymerization reaction is carried out in liquid propylene or vapor phase. Additionally the Federal Food and Drug Administration has established maximum levels of hydrocarbon soluble and volatile materials which can be present in polymer which is in contact with food for human consumption. Accordingly, there is a need for a process to prepare an ethylene-propylene copolymer with low levels of hydrocarbon solubles but with clarity and physical properties suitable for use in packaging but with such a low level of solubles that a separate extraction step is not needed.

A general object of this invention is to provide a process for preparing a random ethylene-propylene copolymer having high clarity and not requiring removal of hydrocarbon solubles. Other objects appear hereinafter.

The term "clarity" is used herein to mean the relative distinctness with which a distant object can be viewed through a molded sample of the resinous copolymer. The term "contact clarity" is used in the art such as Leibson in U.S. Pat. No. 3,702,352 to mean that a sample of the resinous polymer will upon contact with, for example, print on a piece of paper permit the print to be viewed as though through a piece of glass.

The term "distribution number" is defined as the percentage of ethylene units which are isolated between two propylene units. For a polymer chain in which each ethylene unit is between two propylene units, the distribution number would be 100. The distribution number of the random copolymer should be as close to 100 as possible to maximize the product clarity. Other things being equal, the clarity of the resinous copolymer increases as the distribution number increases for a given ethylene content.

I have found that the objects of this invention can be accomplished by contacting under bulk or vapor phase polymerization conditions ethylene and propylene in an essentially constant ratio of about 0.1 to 1.0 mole percent ethylene to about 99.9 to 99.0 mole percent propylene and a catalyst capable of producing substantially crystalline polypropylene. An advantage of this process is that no separation of hydrocarbon soluble material from the copolymer product is required. Hydrogen can be used in amounts sufficient to control the molecular weight of the resinous random copolymers. The resultant polymer has a distribution number greater than 90 and high clarity, high impact strength and less than about 10 weight percent hydrocarbon solubles. If less than about 0.1 mole percent ethylene is used, the polymer has the characteristics of homopolypropylene in that there is a decrease in both the impact strength and clarity of the polymer. If the concentration of ethylene available for the polymerization reaction exceeds about 1.0 mole percent, there is a loss of clarity as the distribution number decreases and there is an increase in the hydrocarbon soluble material produced as evidenced by an increase in the hexane extractables.

In the instant invention best results are obtained when the molar ratio of ethylene in the reactor is maintained at an essentially constant level throughout the polymerization reaction. Other things being equal, the distribution number and consequently the clarity of the copolymer product is maximized for a given ethylene level when the ethylene concentration is constant during the polymerization reaction. Additionally, variations in the concentration can result in an increase in the quantity of hydrocarbon soluble material produced.

The polymerization can be carried out in batch runs or continuous operation. A continuous process is preferred since the ethylene and propylene concentrations in the reactor can be kept more constant to maximize clarity and minimize the hydrocarbon solubles of the random copolymer product. As is well known in the art, care must be taken to maintain impurities such as water, carbon monoxide, etc., at a low enough level in the reactor that there is no interference with the polymerization reaction.

The polymerization reaction can be carried out in liquid propylene (bulk phase) or in vapor phase. Our experiments indicate that if the polymerization reaction is carried out in an inert hydrocarbon medium (slurry phase) ethylene concentrations in excess of 11 mole percent must be present in feedgas to produce a random copolymer with high clarity. Unfortunately, these slurry phase products have in excess of 10 weight percent hydrocarbon solubles which must be removed from the product and constitutes a waste of monomers.

In a bulk phase polymerization, sufficient pressure is maintained in the system so as to have at least a portion of the propylene in the liquid phase. This liquid propylene is a solvent for the ethylene and also serves as a means for removing the heat of polymerization. The pressure required to maintain propylene in the liquid phase depends on the temperature of the system but is preferably about 200 to about 500 p.s.i.g. while the preferred temperature range is about 100° F. to about 200° F.

Vapor phase polymerizations can be carried out in a fluidized bed or stirred bed reactor. A horizontal, stirred reactor and polymerization process are described in commonly assigned U.S. Pat. Nos. 3,957,448 to Shepard et al., 3,965,083 to Jezl et al., 3,971,768 to Peters et al., 3,970,611 and 4,101,289 to Jezl et al. which are incorporated herein by reference. The preferred temperature range for the vapor phase polymerization process is about 100° F. to about 210° F. The pressure can be maintained from about 200 p.s.i.g. to about 500 p.s.i.g. with a pressure of about 300 p.s.i.g. ordinarily utilized. Temperature control in the horizontal, stirred reactor is maintained by spraying a readily volatilized liquid (quench liquid) onto the surface of the polymer bed to evaporatively conduct heat away from the polymer bed. In general, alkanes such as propane, a butane, a pentane, or a hexane or closely boiling mixtures thereof may be used. It should be understood that where the monomer to be polymerized is readily condensible, e.g. propene, the quench liquid can be liquified monomer or a mixture of liquified monomer and an additional quench liquid.

Catalysts useful in the present invention are those capable of polymerizing propylene to a substantially crystalline resinous polymer. Many such catalysts are described in the art with the most useful being those that are the reaction products of transition metal compounds and organometallic compounds of Groups IA-IIIA metals. Such transition metal components include the halides, alkoxides, and alkoxyhalides of titanium and vanadium. The titanium compounds can comprise titanium trichloride, titanium tetrachloride, titanium (IV) alkoxide and titanium (IV) alkoxyhalide (preferably the chloride) wherein the alkoxy groups contain 1 to 6 carbon atoms (methoxy, ethoxy, hexoxy, etc.) The vanadium compounds can include vanadium (III), (IV) or (V) alkoxides, alkoxyhalides (preferably chlorides) wherein the alkoxy groups contain 1 to 6 carbon atoms (methoxy, hexoxy, etc.) or halides (preferably chlorides) and particularly vanadium trichloride, vanadium tetrachloride and the lower alkyl (1 to 6 carbon atoms such as methyl, hexyl, etc.) vanadyl alcoholates such as vanadyl ethylate, vanadyl butylate, etc. Examples of such catalysts are the violet, delta titanium trichloride disclosed in South African Pat. No. 721,245; the brown, beta titanium trichloride disclosed in U.S. Pat. No. 3,984,350 of Karayannis et al.; co-crystallized titanium trichloride-aluminum chloride disclosed by Fennell in U.S. Pat. No. 3,172,865; and the magnesium chloride-titanium tetrachloride catalyst disclosed in German Offenlegungsschrift No. 2,643,143; all of which are incorporated herein by reference.

The preferred Groups IA-IIIA organometallic compounds are the aluminum alkyls. The aluminum alkyl can comprise any lower alkyl, alkyl aluminum compound, such as a trialkyl aluminum, dialkyl aluminum halide (preferably chloride), alkyl aluminum dihalide (preferably the dichloride) wherein the alkyl groups contain 1 to 6 carbon atoms (methyl, ethyl, isopropyl, butyl, hexyl, etc.).

Hydrogen can be utilized in the process to control the molecular weight of the polymer product. The amount of hydrogen used is varied to produce polymer with the desired melt flow. The amount of hydrogen is not critical to the instant invention but as is well known in the art higher levels of hydrogen produce higher levels of hydrocarbon soluble materials.

In the following examples the relative visual clarity for each polymer sample was determined from a 3 inch×2 inch×50 mil plaque by holding each plaque approximately 18 inches from the eye and observing the distinctness of objects approximately one mile away. Each plaque was given an ordinal ranking. The samples prepared by the process of the instant invention had superior visual clarity to any of the comparative samples.

The distribution numbers of the polymer samples were determined by the infrared spectraphotometric method of G. Bucci and T. Simonazzi, J. Poly. Sci., Part C, No. 7, pages 203–212 (1964).

The solubles content was determined by compression molding the polymer sample and then grinding it to 20 mesh particles. The polymer particles were placed in a Soxhlet extractor and extracted with boiling hexane for 6 hours followed by drying in a vacuum oven at 60°–65° C. and 1 millimeter mercury for 16 hours before weighing to determine the weight loss. This weight loss divided by the weight of the original sample multiplied by 100 was the percent solubles content of the sample.

The room temperature Gardner Impact test utilized a Gardner Laboratories Model 1G-1120 variable height impact tester with a cylindrical 0.9 kilogram (2 pound), or a 1.8 kilogram (4 pounds) weight dropped through a vertical guide tube up to a distance of 40 inches. The 2 pound weight was used up to a value of 80 inch-pounds with the 4 pound weight used for samples which had values greater than 80 inch-pounds. The weight was dropped from a height measured in inches so as to just crack a 3 inch×2 inch×50 mil injection molded plaque at room temperature. The test is accurate to ±10%.

The following examples are merely illustrative and should not be construed as limiting the scope of the invention.

EXAMPLE I

This example illustrates the preparation of an ethylene-propylene copolymer in bulk using 0.4 mole percent ethylene in the reactor. A two-liter Parr reactor was dried at 212° F. under a vacuum of about 28 inches of mercury for 12 hours. It was assembled hot and cooled under dry nitrogen to ambient temperature (approximately 72° F.). To the reactor containing one atmosphere of nitrogen were added 10 p.s.i.g. hydrogen and 1200 milliliters of dry liquid propylene. 20 grams of ethylene were weighed into the reactor to give a mixture of about 99.6 mole percent propylene and 0.4 mole percent ethylene and the contents of the reactor were heated to 140° F. A catalyst mixture of 50 milligrams of a violet, delta titanium trichloride described in South African Pat. No. 721,245 and diethylaluminum chloride, (tri-n-butyltin) sulfide and 2,4,6-collidine combined in dry Nujol white oil in the order listed in a molar ratio of 1/3/0.03/0.06 was placed in a catalyst addition chamber. The catalyst mixture was then washed into the reactor with a 100 milliliter portion of liquid propylene. The reactor contents were maintained at 140° F. throughout the 1 hour 20 minute polymerization reaction. Incremental quantities of ethylene were added to maintain the concentration of ethylene in the reactor as constant as possible with 2.0 grams added 15 minutes and 1.0 gram added 25 minutes after the catalyst was introduced. Another 200 milliliters of liquid propylene were added 1 hour after the catalyst was introduced. The polymerization reaction was terminated by rapidly venting the reactor. The catalyst residues in the polymer were deactivated by contact with air and the granular polymer product was dried in a vacuum oven at 160° F. for three hours to yield 99.1 grams of total polymer. The yield was lower in this run than in other examples apparently due to impurities present in the reactor. Results from testing the polymer are given in Tables I and II.

EXAMPLE II

This example illustrates the preparation of an ethylene-propylene copolymer in bulk phase using 0.45 mole percent ethylene in the reactor. The same equipment, conditions, reagents, and procedure were used as in Example I except 8 p.s.i.g. hydrogen was used and the polymerization time was 2 hours. To attempt to maintain a constant composition in the reactor of 0.45 mole percent ethylene and 99.55 mole percent propylene, the following increments of ethylene were added during the polymerization (number of grams at number of minutes after catalyst introduced): 1 at 15; 1 at 25; 1 at 40; 2 at 50; 1 at 76; and 1 at 101. 262 grams of polymer were recovered and treated as in Example I. Results from this polymer are shown in Tables I and II.

EXAMPLE III

Two runs were made in bulk phase with 0.45 mole percent ethylene in the reactor to provide sufficient copolymer for the determination of physical properties. In each run the same equipment, conditions, reagents and procedure was used as in Example II with the following differences:

Run A

The additional ethylene was added in the following increments (number of grams at number of minutes after catalyst introduced): 2 at 15; 1 at 25; 1 at 40; 2 at 50; 1 at 75; and 1 at 100. 273 grams of copolymer were recovered and treated as in Example I. Results from this polymer are given in Tables I and II. Most of this polymer was combined with the product from Run B below.

Run B

This run was a duplicate of Run A with the 254 grams of copolymer product recovered treated as in Example I. Results from this polymer are given in Tables I and II. Most of this polymer was combined with the product from Run A above. Test results from this blend are shown in Table III compared to a commercial poly-(ethylene-propylene) resin from Diamond Shamrock Corp., Grade K-123.

EXAMPLE IV

This example illustrates the preparation of ethylene-propylene copolymer in bulk phase using 0.90 mole percent ethylene in the reactor. The same equipment, conditions, reagents and procedure was used as in Example II except 4 grams of ethylene corresponding to 0.90 mole percent ethylene and 99.10 mole percent propylene were used. Additional ethylene was added in the following increments during the polymerization (number of grams ethylene at number of minutes after catalyst introduced): 1 at 30; 1 at 42; 2 at 52; 2 at 73; 1 at 98; 2 at 108; 2 at 113; and 2 at 119. 269 grams of polymer were recovered and treated as in Example I. Results from this polymer are given in Tables I and II.

EXAMPLE V

This example illustrates the preparation of ethylene-propylene copolymer in bulk phase using 1.34 mole percent ethylene in the reactor. The same equipment, conditions, reagents and procedures were used as in Example II except 6 grams of ethylene corresponding to 1.34 mole percent ethylene and 98.66 mole percent propylene were used. Additional ethylene was added during the polymerization in the following increments (number of grams of ethylene at number of minutes after catalyst introduced): 1 at 17; 1 at 27; 3 at 34; 1 at 44; 1 at 54; 2 at 65; 2 at 79; 2 at 85; 2 at 90; 2 at 96; 2 at 104; 2 at 114; and 1 at 119. 285 grams of polymer were recovered and treated as in Example I. Results from this polymer are given in Tables I and II.

EXAMPLE VI

This example illustrates the preparation of a resinous ethylene-propylene random copolymer in a slurry phase polymerization using 9.5 mole percent ethylene in the gaseous monomer feed.

Monomer Premix Preparation

To a nitrogen purged 5 gallon (19.0 liter) vessel pressured to 2 p.s.i.g. nitrogen at ambient temperature was added 1 p.s.i.g. hydrogen (0.16 moles). Then 7 grams (0.17 moles) of ethylene were charged and the vessel pressure was increased to 140 p.s.i.g. with propylene (1.46 moles) corresponding to the following feed composition:

1.46 moles propylene (81.6 mole percent)

0.17 moles ethylene (9.5 mole percent)
0.16 moles hydrogen (8.9 mole percent)
Nitrogen was added to the above feed to give a final total pressure of 200 p.s.i.g. at ambient temperature.

Polymerization Procedure

A two-liter Parr reactor was dried overnight at 212° F. under a vacuum of about 28 inches of mercury. It was assembled hot and cooled under dry nitrogen to ambient temperature. To the reactor containing one atmosphere of nitrogen were added 0.1 grams of the same type TiCl$_3$ catalyst used in Example I and 1200 milliliters of dry hexane. The polymerization was initiated at ambient temperature by bubbling the monomer feed premix into the reactor below the hexane level in the reactor. The reactor contents were then rapidly brought up to 140° F. and the pressure to 140 p.s.i.g. An essentially constant monomer composition within the reactor was provided for by slowly venting the reactor and adding a fresh supply of monomer from the premix vessel while maintaining the reactor pressure at 140 p.s.i.g. and 140° F. After 1.5 hours the fresh monomer feed was terminated and the reactor vented rapidly to stop the polymerization. The warm (100° F.) polymer slurry in hexane was filtered and the catalyst residues were deactivated by contact with air. The polymer product was devolatilized in a vacuum oven at 160° F. for three hours to yield 76.2 grams of total product. Results from testing the polymer are given in Tables I and II.

EXAMPLE VII

This example illustrates the preparation of a resinous ethylene-propylene random copolymer in a slurry phase polymerization. The same equipment, procedure and reagents were used as in Example VI except (a) the polymerization temperature was 130° F. rather than 140° F., and (b) the polymerization time was 4 hours rather than 1.5 hours. The copolymer product was treated as in Example VI to yield 83.6 grams of total product. Results from testing the polymer are given in Tables I and II.

EXAMPLE VIII

This example illustrates the preparation of a resinous ethylene-propylene random copolymer in a slurry polymerization using 11.5 mole percent ethylene in the monomer feed.

Monomer Premix Preparation

A procedure similar to that of Example VI was used to prepare a monomer feed with the following composition:
1.46 moles propylene (79.8 mole percent)
0.21 moles ethylene (11.5 mole percent)
0.16 moles hydrogen (8.7 mole percent)

Polymerization Procedure

The same equipment, procedure and reagents were used as in Example VI except (a) the polymerization temperature was 130° F. rather than 140° F. and (b) the composition of the monomer premix differed. The copolymer product was treated as in Example VI to yield 60.8 grams of total product. Results from testing the polymer are given in Tables I and II.

Table I

| Example No. | Ethylene Mole % in Reactor | Wt % in Polymer | Distribution No. | Relative Clarity | Gardner Impact[a] |
|---|---|---|---|---|---|
| I | 0.4 | 2.6 | 92–100 | 11 | ND[b] |
| II | 0.45 | 3.0 | 95 | 11 | 93 |
| III (A) | 0.45 | 3.0 | 100 | ND | ND |
| III (B) | 0.45 | 3.4 | 100 | ND | ND |
| IV | 0.90 | 4.0 | 97 | ND | ND |
| V | 1.34 | 6.0 | 82 | ND | ND |
| VI | 9.5[c] | 1.8 | 99 | 6 | 25 |
| VII | 9.5[c] | 1.7 | 100 | 6 | 25 |
| VIII | 11.5[c] | 2.3 | 99 | 8 | 45 |
| DSK-123[d] | NA[e] | 2.7 | 92 | 10 | 80 |

[a]At room temperature in inch-pounds;
[b]not determined;
[c]Feedgas Composition for slurry phase polymerizations;
[d]commercial poly(ethylene-propylene) resin Grade K-123 from Diamond Shamrock Corp.;
[e]not available.

The results in Table I show that for bulk phase polymerizations the distribution number of the copolymer product remained above 90 until the ethylene concentration in the reactor exceeded about one mole percent and the copolymer contained about six weight percent ethylene. The quantity of ethylene incorporated into the copolymer increased as the concentration of ethylene in the polymerization reactor was increased. The polymer of Example II which contained about 3.0 weight percent ethylene had the highest relative clarity and a high room temperature impact strength. The commercial resin DSK-123 had a slightly lower relative clarity and lower impact strength than did resin prepared by my process as shown in Example II.

The copolymers prepared by a slurry polymerization process, i.e., Examples VI–VIII, did not contain as much ethylene as the copolymers prepared by a bulk process even though the feedgas for the slurry polymerizations contained about 10 mole percent ethylene. It was calculated that the hexane in the reactor contained in excess of 2 mole percent ethylene. The lower level of ethylene in the polymer accounts for the lower impact strength and lower clarity than in Example II. The clarity of these resins was lower than Examples I and II even though the distribution numbers were high because there was apparently insufficient ethylene in the polymer to disrupt the crystallinity and increase the clarity.

Table II

| Example No. | Ethylene Mole % in Reactor | Wt % in Polymer | Melt Flow g/10 min | Total Solubles wt % |
|---|---|---|---|---|
| I | 0.4 | 2.6 | 4.6 | 3.9 |
| II | 0.45 | 3.0 | 0.7 | 3.6 |
| III (A) | 0.45 | 3.0 | 1.4 | 4.3 |
| III (B) | 0.45 | 3.4 | 0.5 | 5.4 |
| IV | 0.90 | 4.0 | 0.8 | 8.7 |
| V | 1.34 | 6.0 | 0.5 | 19.8 |
| VI | 9.5[a] | 1.8 | NA[b] | 15.6 |
| VII | 9.5[a] | 1.7 | NA | 9.2 |
| VIII | 11.5[a] | 2.3 | NA | 16.1 |
| DSK-123[c] | NA | 2.7 | 2.6 | (4.9)[d] |

[a]Feedgas composition for slurry phase polymerizations;
[b]Not Available;
[c]See Table 1;
[d]extraction on commercial resin as received.

The results in Table II from Examples I–V show that the quantity of soluble material formed during the polymerization reaction increased as the concentration of ethylene in the reactor was increased. When the quantity of ethylene in the reactor was greater than about one mole percent, the solubles were unacceptably high as shown by Example V. The high level of solubles relative to the amount of ethylene in the polymer observed in the slurry phase polymerization Examples VI–VIII is probably due to the concentration of ethylene changing during the polymerization. The quantity of solubles in the commercial sample DSK-123 was obtained by extracting the resin as received and it is not known if solubles had been removed from the resin before it was received.

As shown in Tables I and II an optimum balance between clarity and solubles occurs with approximately three weight percent ethylene incorporated into the resin.

Table III[a]

| Polymer Sample | Heat Deflection °F. | Notched Izod ft-lb/in. | Tensile Impact ft-lb/in.$^2$ | Flexural Modulus psi |
|---|---|---|---|---|
| III[b] | 167 | 2.5 | 84.3 | 113,000 |
| DSK-123[c] | 166 | 1.5 | 67.1 | 121,000 |

| Polymer Sample | Tensile Properties | | | |
|---|---|---|---|---|
| | YTS psi | UTS psi | Yield % | Break % |
| III[b] | 3990 | 2960 | 20.2 | 412 |
| DSK-123[c] | 4170 | 2750 | 12.0 | 320 |

[a]The following ASTM test procedures were used: Heat Deflection, D-648; Notched Izod, D-256; Tensile Impact, D-1822; Flexural Modulus, D-790; and, Tensile Properties, D-638;
[b]Blend of Runs A and B of Example III;
[c]See Table I.

The results in Table III show that the blend of copolymer product from duplicate polymerization runs had physical properties comparable or superior to those of the commercial resin DSK-123.

I claim:

1. A process for preparing a resinous random copolymer of ethylene and propylene having high clarity and a distribution number greater than 90 which comprises
   (i) contacting under bulk or vapor phase polymerization conditions components comprising
      (a) a catalyst capable of producing substantially crystalline polypropylene which comprises the reaction product of one or more transition metal compounds and one or more organometallic compounds of Group IA–IIIA metals; and
      (b) ethylene and propylene in an essentially constant ratio of about 0.1 to 1.0 mole percent ethylene to about 99.9 to 99.0 mole percent propylene,
   and, (ii) isolating said resinous random copolymer.

2. The process of claim 1 wherein the ethylene and propylene are in an essentially constant ratio of about 0.3 to about 0.8 mole percent ethylene to about 99.7 to about 99.2 mole percent propylene.

3. The process of claim 2 wherein the components are contacted at a temperature of about 100° F. to about 200° F. and a pressure of about 200 p.s.i.g. to about 500 p.s.i.g.

4. The process of claim 3 wherein said components are contacted under bulk phase polymerization conditions.

5. The process of claim 3 wherein said components are contacted under vapor phase polymerization conditions.

6. The process of claim 1 wherein hydrogen is used to control the molecular weight of said random copolymer.

7. The process of claim 1 wherein said catalyst comprises a titanium halide and an organoaluminum compound.

8. A resinous random copolymer of ethylene and propylene having high clarity and a distribution number greater than 90 prepared by the process which comprises contacting under bulk or vapor phase polymerization conditions components comprising
   (a) a catalyst capable of producing substantially crystalline polypropylene which comprises the reaction product of one or more transition metal compounds and one or more organometallic compounds of Group IA–IIIA metals; and
   (b) ethylene and propylene in an essentially constant ratio of about 0.1 to 1.0 mole percent ethylene to about 99.9 to 99.0 mole percent propylene.

9. The random copolymer of claim 8 in the form of a transparent, shaped article.

* * * * *

UNITED STATES PATENT OFFICE
CERTIFICATE OF CORRECTION

Patent No. 4,219,633                    Dated August 26, 1980

Inventor(s) Paul E. Johnson

It is certified that error appears in the above-identified patent and that said Letters Patent are hereby corrected as shown below:

| Patent Column | Line | |
|---|---|---|
| 8 | 64 | "See Table 1" should be --see Table I-- |

Signed and Sealed this

*Third* Day of *March 1981*

[SEAL]

*Attest:*

*Attesting Officer*                    RENE D. TEGTMEYER
                                        *Acting Commissioner of Patents and Trademarks*